United States Patent [19]

Liakumovich et al.

[11] 4,128,708
[45] Dec. 5, 1978

[54] PROCESS FOR PREPARING CIS-POLYISOPRENE

[76] Inventors: Alexandr G. Liakumovich, ulitsa Galeeva, 10, kv. 8, Kazan; Boris I. Pantukh, ulitsa Khudaiberdina, 162, kv. 89, Bashkirskaya ASSR, Sterlitamak; Mengzda K. Sultanova, ulitsa Kommunisticheskaya, 43, kv. 257, Bashkirskaya ASSR, Sterlitamak; Vasily P. Popov, ulitsa Revoljutsionnaya, 15, kv. 8, Bashkirskaya ASSR, Sterlitamak; Genrikh A. Tolstikov, ulitsa Dostoevskogo, 102/3, kv. 61, Bashkirskaya ASSR, Ufa; Jury B. Monakov, ulitsa Khalturina, 53/1, kv. 8, Bashkirskaya ASSR, Ufa; Valery P. Juriev, ulitsa Dostoevskogo, 102/3, kv. 14, Bashkirskaya ASSR, Ufa; Elena Y. Mandelshtam, prospekt Mira, 72, kv. 2, Moscow; Boris S. Korotkevich, ulitsa Fortunatovskaya, 31/35, kv. 71, Moscow; Jury A. Shmuk, Leninsky prospekt, 13, kv. 31, Moscow, all of U.S.S.R.

[21] Appl. No.: 760,546

[22] Filed: Jan. 19, 1977

[51] Int. Cl.$^2$ .................... C08F 4/64; C08F 36/08
[52] U.S. Cl. .................... 526/162; 526/159; 526/335; 526/340.2
[58] Field of Search ............. 526/159, 162, 335, 340.2

[56] References Cited

U.S. PATENT DOCUMENTS

| 3,127,386 | 3/1964 | Saltman ............................. 526/159 |
| 3,180,858 | 4/1965 | Farrar, Jr. ........................ 526/159 |
| 3,281,404 | 10/1966 | Natta et al. ..................... 526/159 |
| 3,311,604 | 3/1967 | Marconi et al. ................. 526/159 |
| 3,455,891 | 7/1969 | Winkler et al. ................. 526/159 |
| 3,580,899 | 5/1971 | Massoubre ...................... 526/159 |
| 3,607,854 | 9/1971 | Antropiusova et al. ......... 526/159 |

FOREIGN PATENT DOCUMENTS 11815  4/1972  Japan ........................ 526/159

*Primary Examiner*—Alan Holler
*Attorney, Agent, or Firm*—Lackenbach, Lilling & Siegel

[57] ABSTRACT

A process for preparing cis-polyisoprene which comprises polymerization of isoprene in a medium of a non-polar hydrocarbon solvent at a temperature ranging from 0° to 60° C in the presence of a catalyst comprising a reaction product of titanium tetrachloride and an intracyclic organo-aluminium compound having the formula:

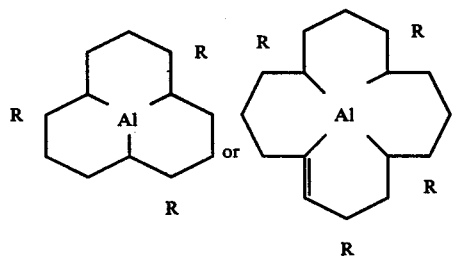

wherein R, the same or different, are H, CH$_3$; taken in a molar ratio of 1:1.05–1.1 respectively; weight ratio of isoprene to said catalyst being equal to 100:0.2–0.7.

The present invention makes it possible to improve the quality of the thus-obtained cis-polyisoprene and to increase the catalyst capacity by two times due to modification of its properties.

1 Claim, No Drawings

PROCESS FOR PREPARING CIS-POLYISOPRENE

The present invention relates to the art of synthesis of stereospecific synthetic rubbers and, more specifically, to a process for preparing cis-polyisoprene which is widely employed as the starting material for tire industry and for the manufacture of rubber articles.

Known in the art is a process for preparing cis-polyisoprene by way of polymerization of isoprene in a non-polar hydrocarbon solvent such as heptane at a temperature within the range of from 0° to 60° C. in the presence of a catalyst. As the catalyst use is made of a reaction product of tetravalent titanium halides and organic trialkylaluminium compounds such as a reaction product of titanium tetrachloride and triethylaluminium at an equimolar ratio therebetween. the catalyst capacity is 90–100 g of the polymer (cis-polyisoprene) per one gram of the catalyst.

As a result of the polymerization, cis-polyisoprene is obtained having a molecular mass of from 0.6 mln to 0.8 mln and containing 92–94% of cis-units; its index of gel-fraction swelling is 25 to 30%.

This prior art process has some disadvantages residing in a substantial content of trans-isomers and polymers with 1,2,3,4 units; presence of a gel with a low swelling index and insufficiently high molecular weight; and in a rather low capacity of the catalyst.

It is an object of the present invention to enhance the desired product quality.

This object is accomplished by that in a process for preparing cis-polyisoprene by way of polymerization of isoprene in a medium of a non-polar hydrocarbon solvent at a temperature within the range of from 0° to 60° C. in the presence of a catalyst, viz. a reaction product of titanium tetrachloride and an organo-aluminium compound, followed by separation of the desired product, in accordance with the present invention use is made, as the organo-aluminium compound, an intracyclic organo-aluminium compound corresponding to the following generic formula:

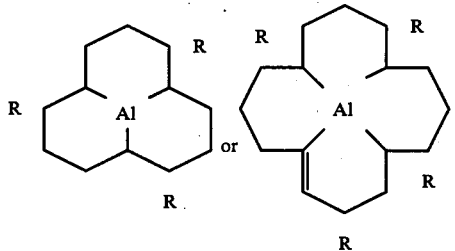

wherein R, the same or different, are H, CH$_3$; said titanium tetrachloride and intracyclic organo-aluminium compound being taken in a molar ratio of 1:1.05–1.1 respectively and a weight ratio between isoprene and the catalyst being equal to 100:0.2–0.7.

The use of the intracyclic organo-aluminium compound according to the present invention instead of an organic trailkyl aluminium compound in the prior art process makes it possible to obtain a catalyst featuring a higher activity and sterospecificity, whereby the quality of the resulting cispolyisoprene is substantially improved and the catalyst capacity is increased by two times.

The intracyclic organo-aluminium compounds according to the present invention are not self-inflammable in the air, whereas trialkylaluminium (triethyl, tributyl, tripropyl-) compounds are highly inflammable thus creating substantial difficulties in handling and operation therewith.

The process for preparing cis-polyisoprene in accordance with the present invention is preferably performed in the following manner.

A required amount of the catalyst per 100 g of isoprene is added into a solution of isoprene in a non-polar hydrocarbon solvent such as heptane, toluene or isopentane.

Polymerization is carried out at a temperature within the range of from 0° to 60° C. for a period ranging from 1 to 2.5 hours; for example, at the temperature of 25° C. polymerization is carried out for 1.5 hours.

An equimolar amount of methanol is added into the resulting cis-polyisoprene solution, to inactivate the catalyst, along with an antioxidant. The solvent is distilled-off with steam and the remaining rubber is dried at the temperature of 70° C. to a constant weight.

The catalyst employed in the process according to the present invention comprises a reaction product of titanium tetrachloride and the above-described intracyclic organo-aluminium compound.

The catalyst is prepared in the following manner.

To a solution containing one mole of titanium tetrachloride in a non-polar hydrocarbon solvent similar to that for the monomer such as heptane, toluene or isopentane, at a temperature ranging from −25° To 20° C. under vigorous stirring and heat removal 1.05 to 1.1 mole of an intracyclic organo-aluminium compound of the following formula is added:

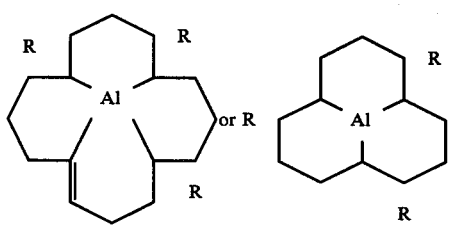

wherein R, the same or different, are H, CH$_3$.

The resulting solution is maintained for a period of from 1 to 20 hours at a temperature within the range of from −15° to 0° C. Thereafter, the thus-prepared catalyst is ready for use.

The process for preparing cis-polyisoprene according to the present invention, as compared to the prior art process, has a advantage residing in that stereospecificity of cis-polyisoprene is increased up to 98% (vs. 94% in the prior art processes), wherefore mechanical strength of vulcanizates based on such cis-polyisoprene rubber becomes substantially increased; molecular mass is also increased up to 1 mln to 1.5 mln as viscosimetrically measured (vs. 0.6–0.8 mln in the prior art processes); gel-fraction swelling index is 80–160% (vs. 25–30% in the prior art processes). The catalyst capacity in the process according to the present invention amounts to 190–240 g of the polymer per 1 g of the catalyst.

For a better understanding of the present invention some specific examples illustrating the process for preparing cis-polyisoprene are given hereinbelow.

EXAMPLE 1

Into a solution containing 100 g of isoprene and 900 g of heptane there is added 0.5 g of a catalyst prepared by interaction of 1 mole of TiCl₄ and one mole of perhydroalumophenolene:

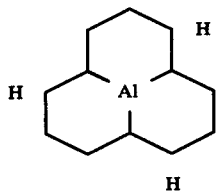

Polymerization is carried out at the temperature of 20° C. for 2 hours. Thereafter, the polymer solution is inactivated with methanol, stabilized with para-phenylenediamine and outgassed in vacuum to give 96.5 g of cis-polyisoprene.

Molecular mass of the product, as measured viscosimetrically, is 1.1 mln. Gel-fraction swelling index is 80%. Cis-stereospecificity of the thus-obtained polyisoprene is 98% as determined by the nuclear magnetic resonance method.

EXAMPLE 2

Into a solution containing 100 g of isoprene and 900 g of toluene there is added 0.4 g of a catalyst prepared by interaction of one mole of titanium tetrachloride and 1.1 mole of methylperhydroalumophenolene:

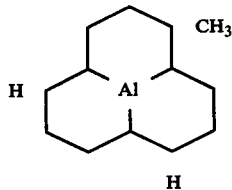

The polymerization is carried out at the temperature of 60° C. for 1 hour. Thereafter, the polymer solution is inactivated with methanol, stabilized with para-phenylenediamine and outgassed in vacuum to give 98 g of cis-polyisoprene.

Molecular mass of the polymer, as measured viscosimetrically, is 1.0 mln. Gel-fraction swelling index is 100%. Cis-stereospecificity of polyisoprene as determined by the nuclear magnetic resonance method is 97.5%.

EXAMPLE 3

Into a solution containing 100 g of isoprene and 900 g of isopentane there is added 0.35 g of a catalyst prepared by interaction of one mole of titanium tetrachloride and 1.05 mole of cyclohexadecatetraenylaluminium:

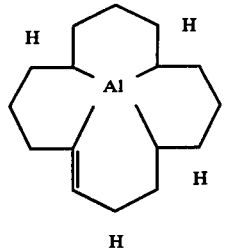

Polymerization is conducted at the temperature of 10° C. for 2.5 hours. Thereafter, the polymer solution is inactivated by methanol, stabilized by para-phenylenediamine and outgassed in vacuum to give 95 g of cis-polyisoprene.

Molecular mass of the polymer, as measured viscosimetrically, is 1.5 mln. Gel-fraction swelling index is 90%. Cis-stereospecificity of the thus-obtained polyisoprene is 98.5% as measured by the method of nuclear magnetic resonance.

EXAMPLE 4

Into a solution containing 100 g of isoprene and 900 g of isopentane there is added 0.6 g of a catalyst prepared by interaction of one mole of titanium tetrachloride and 1.1 mole of perhydroalumophenolene:

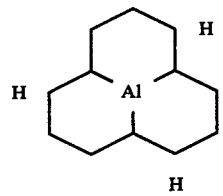

Polymerization is carried out at the temperature of 40° C. for 1.5 hour. Thereafter, the polymer solution is subjected to inactivation with methylene, stabilized with para-phenylenediamine and outgassed in vacuum to give 98.5 g of cis-polyisoprene. Molecular mass of the product, as measured viscosimetrically, is 1.05 mln. Gel-fraction swelling index is 60%. Cis-stereospecificity of polyisoprene is 97% as measured by the nuclear magnetic resonance method.

EXAMPLE 5

Into a solution containing 100 g of isoprene and 900 g of toluene there is added 0.2 g of a catalyst prepared by interaction of 1 mole of titanium tetrachloride and 1 mole of trimethylperhydroalumophenolene:

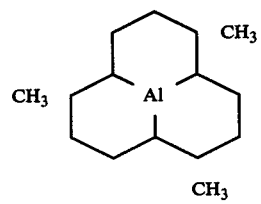

Polymerization is carried out at the temperature of 50° C. for 2 hours. Thereafter the polymer solution is inactivated with methanol, stabilized with paraphenylenediamine and outgassed in vacuum to give 95 g of cis-polyisoprene.

Molecular mass of the polymer, as measured viscosimetrically, is 1.1 mln. Gel-fraction swelling index in 85%. Cis-stereospecificity of the thus-obtained polyisoprene is 98.5% as measured by the nuclear magnetic resonance method.

EXAMPLE 6

Into a solution containing 100 g of isoprene and 900 g of heptane there is added 0.7 g of a catalyst prepared by interaction of one mole of titanium tetrachloride and 1.1 mole of tetramethylhexadecatetraenylaluminum:

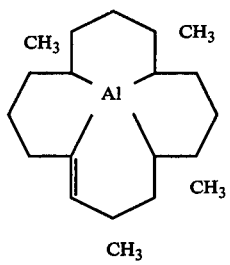

Polymerization is carried out at the temperature of 25° C. for 1.5 hours. Thereafter, the polymer solution is subjected to inactivation with methanol, stabilized with paraphenylenediamine and out gassed in vacuum to give 99 g of cis-polyisoprene.

Molecular mass of the polymer, as determined viscosimetrically is 1.5 mln. Gel-fraction swelling index is 120%. Cis-stereospecificity of the thus-prepared polyisoprene is 99% as determined by the method of nuclear magnetic resonance.

EXAMPLE 7

Into a solution containing 100 g of isoprene and 900 g of iso-pentane there is added 0.4 g of a catalyst prepared by interaction of one mole of TiCl$_4$ and one mole of methylcyclohexadecatetraenylaluminium:

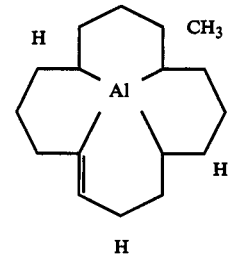

Polymerization is conducted at the temperature of 45° C. for 1 hour. Then the polymer solution is inactivated with methanol, stabilized with para-phenylenediamine and outgassed in vacuum to give 94 g of cis-polyisoprene having molecular mass of 1 mln as measured viscosimetrically; gel-fraction swelling index 60%. Cis-stereospecificity of polyisoprene is 97.5% (as measured by the nuclear magnetic resonance method).

What we claim is:

1. A process for preparing cis-polyisoprene comprising polymerization of isoprene in a medium of a non-polar hydrocarbon solvent at a temperature ranging from 0° to 60° C. in the presence of a catalyst representing a reaction product of titanium tetrachloride and an intracyclic organo-aluminium compound selected from the group consisting of compounds having the formulae:

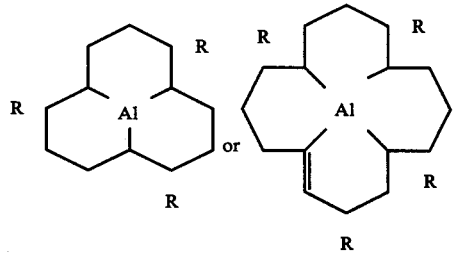

wherein R is selected from the group consisting of H and CH$_3$; said R radicals being the same or different; the reaction product components being taken in a titanium: aluminium molar ratio of 1:1.05–1.1 respectively; weight ratio between isoprene and said catalyst being equal to 100:0.2–0.7; and isolation of the desired product on completion of the polymerization.